(12) United States Patent
Willeke

(10) Patent No.: US 12,146,628 B2
(45) Date of Patent: Nov. 19, 2024

(54) HEADLAMP FOR A MOTOR VEHICLE

(71) Applicant: Hella GmbH & Co. KGaA, Lippstadt (DE)

(72) Inventor: Franz-Georg Willeke, Anröchte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/303,925

(22) Filed: Apr. 20, 2023

(65) Prior Publication Data

US 2023/0383919 A1    Nov. 30, 2023

(30) Foreign Application Priority Data

Apr. 25, 2022   (DE) .......................... 102022109864.8

(51) Int. Cl.
*F21S 41/19*        (2018.01)

(52) U.S. Cl.
CPC .................................. *F21S 41/192* (2018.01)

(58) Field of Classification Search
CPC ...... F21S 41/675; B60Q 1/068; B60Q 1/0683
See application file for complete search history.

(56) References Cited

U.S. PATENT DOCUMENTS

| | | | | |
|---|---|---|---|---|
| 4,674,018 A | * | 6/1987 | Ryder | F16H 25/20 362/424 |
| 5,775,794 A | * | 7/1998 | Schmitt | B60Q 1/0683 362/294 |
| 2017/0370548 A1 | * | 12/2017 | Dinant | F21S 41/295 |
| 2021/0222850 A1 | * | 7/2021 | Harada | F21S 43/19 |

FOREIGN PATENT DOCUMENTS

| | | |
|---|---|---|
| DE | 3636036 A1 | 5/1987 |
| DE | 102012024050 A1 | 6/2013 |
| DE | 102012100459 A1 | 7/2013 |

\* cited by examiner

*Primary Examiner* — Eric T Eide
(74) *Attorney, Agent, or Firm* — Husch Blackwell LLP

(57) ABSTRACT

A headlamp for a motor vehicle is provided with a light module, a carrier frame, and a setting device. The light module is accommodated at the carrier frame so that it can be rotated around a rotary axis (D). The setting device features an adjusting screw that connects a holder section of the light module radially at a distance from the rotary axis (D) to a mounting section of the carrier frame in such a way that the light module is arranged in a target position. The setting device features a pretensioning element held by the adjusting screw that pretensions the light module in the target position. The setting device features a setting element held by the adjusting screw that is arranged on the side of the holder section facing away from the pretensioning element and is designed to undergo heat-induced contraction or shrinkage.

6 Claims, 3 Drawing Sheets

HEADLAMP FOR A MOTOR VEHICLE

CROSS REFERENCE

This application claims priority to German Application No. 10 2022 109864.8, filed Apr. 25, 2022, the entirety of which is hereby incorporated by reference.

FIELD OF THE INVENTION

The present invention relates to a headlamp for a motor vehicle, at least comprising a light module, a carrier frame and a setting device, where the light module is accommodated on the carrier frame so that it can be rotated around a rotary axis, where the setting device features an adjusting screw that connects a holder section of the light module radially at a distance from the rotary axis to a mounting section of the carrier frame in such a way that the light module is arranged in a target position where the setting device features a pretensioning element held by the adjusting screw that pretensions the light module in the target position.

BACKGROUND OF THE INVENTION

With motor vehicle headlamps described at the beginning of this document, the carrier frame acts as a holder and reference system for the various light modules, for example the low beam module and the high beam module. As the factory default, the light modules are arranged using the setting device in a lighting technology target position, i.e. in a target position and target orientation in relation to the carrier frame, on the carrier frame. This ensures that the headlamp in the intended installation position on the motor vehicle generates a required light distribution ahead of the motor vehicle, specifically the required courses of the light/dark cut-off lines. In particular, depending on the light modules, the headlamps can feature several setting devices with rotary axes with different orientations, for example to the horizontal and vertical alignment of the light modules on the carrier frame. In this respect, the rotation angle of the light modules around the respective rotation angle is determined by the position of the associated adjusting screw, i.e., that an adjustment to the screw-in depth of the adjusting screw results in a corresponding tilt of the direction of light-emission of the light modules.

Plastics are usually used for the supporting components of the light modules, in particular thermoplastics that can be processed by injection molding. It is a known problem that, when deployed in practical applications in headlamps, these components are subject to irreversible dimensional distortion due to the thermal and thermomechanical loads occurring in such applications. This results in a deviation from the target position set as factory default on the carrier frame and thus in an unwanted change in the light distribution generated by the headlamp, for example a shift in the horizontal light/dark cut-off line, which is given by the height of the light cone relative to horizontal. In order to compensate for this distortion that occurs in particular in the first operating cycles of the headlamp, it is usually necessary for a specialist garage to perform a manual readjustment of the light modules using the setting device.

BRIEF SUMMARY OF THE INVENTION

The purpose of the present invention is to propose a headlamp of the given design that is formed in such a way that the aforementioned shift in the light modules away from the factory default target positions during deployment of the headlamp in a practical application is prevented or at least reduced.

The invention includes the technical contribution so that the setting device features a setting element held by the adjusting screw that is arranged on a side of the holder section facing away from the pretensioning element and that is designed for a heat-induced contraction or shrinkage.

In this respect, the invention is based on the idea of integrating a compensating element in the form of the setting element that performs a dimensional contraction or shrinkage simultaneously with the thermomechanical distortion of the light module that brings about a rotation of the light module around the rotary axis on the carrier frame that compensates for the distortion of the light module. In this context, the contraction or shrinkage is caused by heating of the setting element during operation of the headlamp. During contraction or shrinkage, the setting element contracts along the axis of the adjusting screw and such contraction provides space for a shift in the holder section of the light module coming into contact with the adjusting screw by means of a corresponding expansion of the pretensioning element. According to the invention, the contraction or shrinkage of the setting element is adjusted to the dimensional distortion in such a way that the resulting rotation guides the light module into such a position on the carrier frame in which the light module generates the required light distribution ahead of the vehicle, i.e. that the changes in the light distribution set as factory default resulting from the thermomechanical distortion of the light module can be compensated for. In line with the irreversible character of the distortion of the light module to be compensated for, the inventive contraction or shrinkage of the setting element is irreversible.

Contraction is defined as the reduction in volume of a workpiece without material being removed or external pressure being exerted. Contraction occurs for example through drying with loss of water or another solvent. Where a three-dimensional hollow body becomes smaller, i.e. its geometrical dimensions and/or its shape change, without a reduction in the volume of the material, this is designated as contraction. Contraction occurs in plastics, induced by heat above the glass transition temperature (amorphous plastics) or above the crystallization temperature (semi-crystalline plastics) and is caused by the resetting of molecule orientations and the relaxation of residual stress. The orientations arise in particular as a consequence of the method of processing and consequently depend on technical processing parameters.

For example, the inventive setting element features a thermoplastic polymer, in particular a polyvinyl chloride.

Preferentially, the contraction of the setting element can be induced by means of heating up to a temperature in the range of between 60° C. and 100° C. This temperature range is reached during operation of the headlamp due to the dissipated heat from the light sources. The dissipated heat is also the cause of the irreversible distortion of the light module so that the compensating contraction of the setting element takes place essentially simultaneously.

In particular, the setting element is conditioned in such a way that the contraction can bring about a predefined reduction in the dimension of the setting element in the direction parallel to the axis of the adjusting screw. Such conditioning can be created, for instance, through manufacturing by means of extrusion. The setting element has, for example, a hollow cylindrical shape and, due to the extrusion procedure, the molecules of the plastic are predominantly oriented along the axis of the cylinder, which corresponds to the axis of the adjusting screw. The setting element is correspondingly pretensioned in accordance with the process parameters during manufacturing and undergoes a predefined contraction upon heating to a supercritical temperature, i.e., a contraction along the axis of the cylinder.

To limit the contraction of the setting element along the axis of the adjusting screw, sections of the setting element can be surrounded by a rigid enclosure forming a circumferential gap. During the contraction process, such an enclosure limits the lateral expansion of the setting element in the level vertical to the contraction direction so that the further contraction process is hindered as soon as the setting element fills the circumferential gap and comes into contact with the enclosure.

As a further design measure to influence the contraction or the shrinkage of the setting element, the setting device of the inventive headlamp can be designed in such a way that at least one front side of the setting element makes contact at a contact face with a large number of prongs, studs or other elevations. The contact face can, for example, be formed by the front face of a nut or a washer. When using a plastic for the setting element, the heat-induced contraction or shrinkage is accompanied by a softening of the plastic so that the prongs are driven into the setting element by the application of force by the pretensioning element. This provides a further possibility to influence the extent of the change in the shape of the setting element.

In a specific embodiment, the rotary axis runs horizontally in a specified installation position of the inventive headlamp on the motor vehicle, where the setting device is designed in such a way that when the setting element contracts or shrinks the light module can be rotated around the rotary axis by the pretensioning element in such a direction of rotation that the direction of light emission from the light module is pivoted upwards. Subject to the effect of gravity, the heat-induced distortion of the light module often leads to a lowering of the light module and thus to a lowering of the light/dark cut-off line of the light distribution emitted onto the road ahead of the motor vehicle. This effect is compensated for by use of the inventive setting element.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1A:
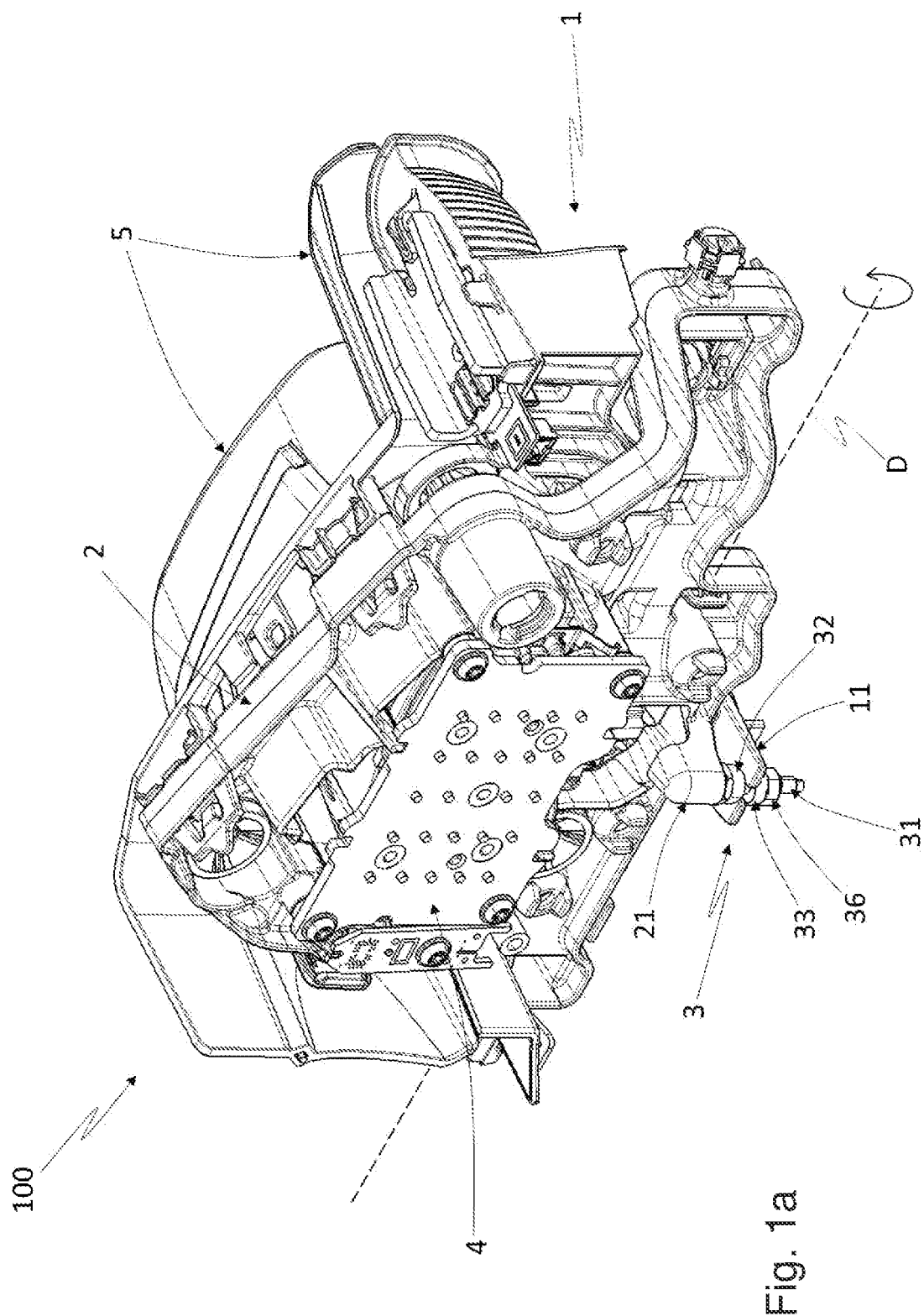
FIGS. 1a and 1b illustrate a perspective view and a side view, respectively, of part of an inventive headlamp.
Figure 1B:
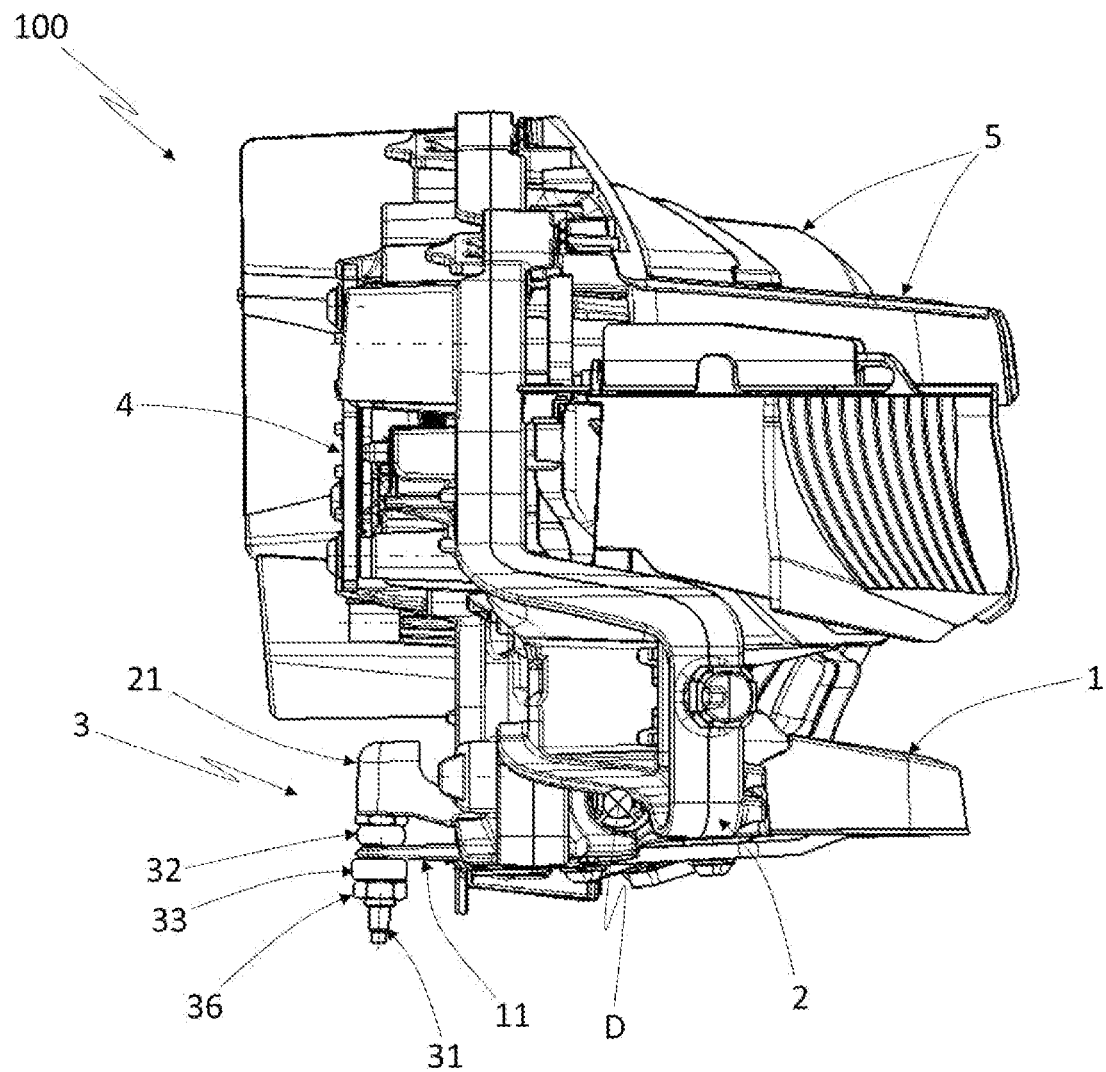

FIG. 1a and FIG. 1b show a part of an inventive headlamp 100 in a perspective view and in a side view. The headlamp 100 is shown without housing and comprises the light groups 5 for daylight running, low beam and high beam functions and the light module 1 arranged below it. Here, the light module 1 acts, for example, as an additional high beam with a particularly long range in which a shift in the horizontal light/dark cut-off line for operational reasons is particularly unwanted. The light module 1, the light groups 5, the corresponding printed circuit board 4 are accommodated on the carrier frame 2.

The light module 1 is accommodated on the carrier frame 2 so as to be rotatable around the rotary axis D running horizontally and the rotation angle of the light module 1 can be adjusted by means of the setting device 3. For this purpose the setting device 3 features the adjusting screw 31 which connects a holder section 11 of the light module 1 radially at a distance from the rotary axis D to the mounting section 21 of the carrier frame 2 in such a way that the light module 1 is arranged in a target position from a lighting technology perspective. The adjusting screw 31 takes the form of a stud and engages a thread at the mounting section 21 as well as in a thread on the nut 36. There is no thread on holder section 11, rather the holder section 11 can be moved along the axis of the adjusting screw 31. The setting device 3 additionally features the pretensioning element 32 held by the adjusting screw 31 that pretensions the light module 1 in the target position. The pretensioning element 32 is, for example, made from an elastic rubber plastic; alternatively, a spiral-shaped pressure spring could be used, for example.

In accordance with the invention, the setting device 3 comprises the setting element 33 held by the adjusting screw 31 that is arranged on the side of the holder section 11 facing away from the pretensioning element 32 and is designed to undergo heat-induced contraction or shrinkage. In the event of a heat-induced contraction of the setting element 33 along the axis of the adjusting screw 31, the holder section 11 is shifted downwards under the application of force from the expanding pretensioning element 32, so that the light module 1 is rotated around the rotary axis D in the direction of rotation shown in FIG. 1a. This pivots the light emission direction of the light module 1 upwards. The setting device 3 is consequently designed to compensate for such a thermomechanical distortion of the light module 1 that led to a lowering of the light/dark cut-off line.

FIGS. 2a, 2b, 3, and 4 show schematic cross-section views (in each case, shown as one half with the dashed line as mirror plane) of various sample embodiments of the setting device 3 as a component of an inventive headlamp. The cross-section views each show adjusting screw 31 which is arranged so as to engage in internal threads (not shown) on the mounting section 21 of the carrier frame and on the nut 36 and which extend through an non-threaded aperture on holder section 11 of the light module. The holder section 11 is clamped in between the pretensioning element 32 and the setting element 33 subject to pretensioning.

Figure 2A:
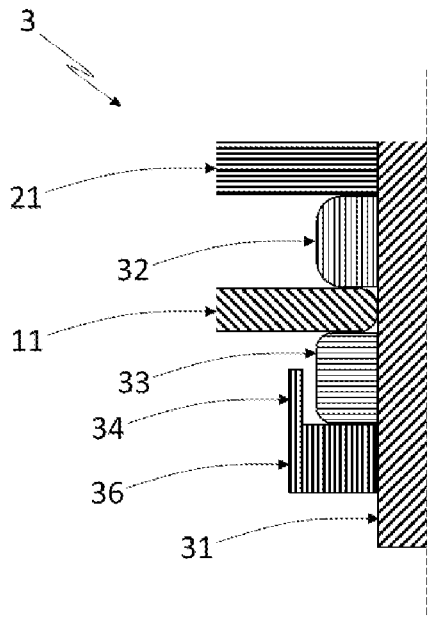
FIGS. 2a and 2b illustrate cross-section views of a first sample embodiment of an inventive setting device in an initial state and in a state with contracted setting element.
Figure 2B:
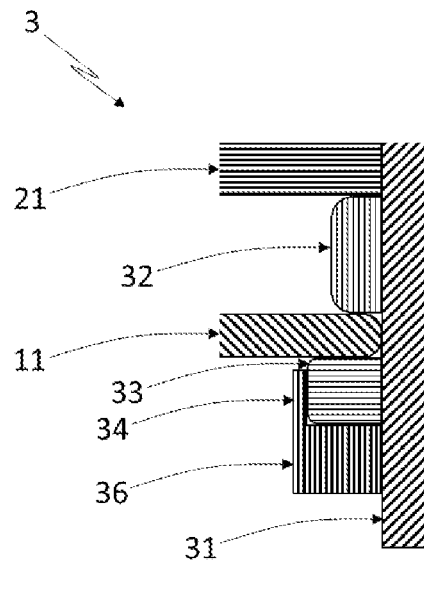

In FIG. 2a, the setting device 3 is in an initial state adjusted as factory default, in which the light module has been adjusted into the target position from a lighting technology perspective and in which the setting element 33 has not yet been subject to a heat-induced contraction or shrinkage. In contrast to this, FIG. 2b shows a state that, according to the invention, is taken up after the first phase of operation in practice of the associated headlamp, i.e., in which the setting element 33 has been irreversibly contracted for the purpose of compensating for distortion. The contraction of the setting element 33 is associated with a shift in the holder section 11 subject to the pretensioning force of the pretensioning element 32 that is expanding in this context. The extent of the contraction of the setting element 33 is limited by the rigid enclosure 34, that takes the form, for example, of a protruding continuation of the nut 36 and which surrounds the setting element 33 in sections. The circumferential gap formed by this in the initial state is filled by the transverse expansion during the contraction process of the setting element 33 and the further contraction process is hindered by the setting element 33 coming into contract with the enclosure 34.

Figure 3:
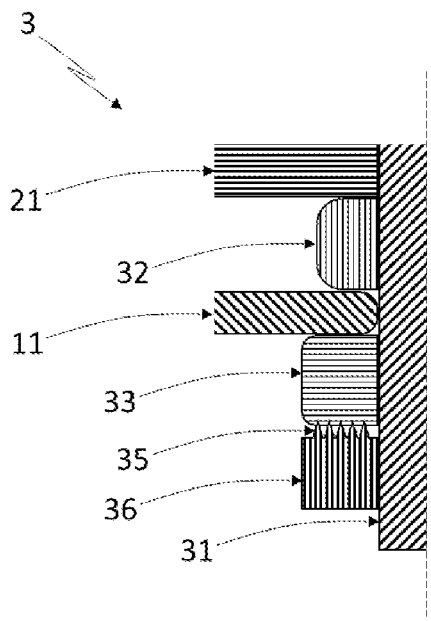
FIG. 3 is a cross-section view of a second sample embodiment of an inventive setting device.

In contrast to the sample embodiment of FIG. 2a, the sample embodiment of FIG. 3 features a nut 36 that features a contact surface with a large number of prongs 35 for the front face of the setting element 33. In the event of a heat-induced softening of the setting element 33, the prongs 35 penetrate the setting element 33 and thus ensure a targeted influencing of its contraction.

Figure 4:
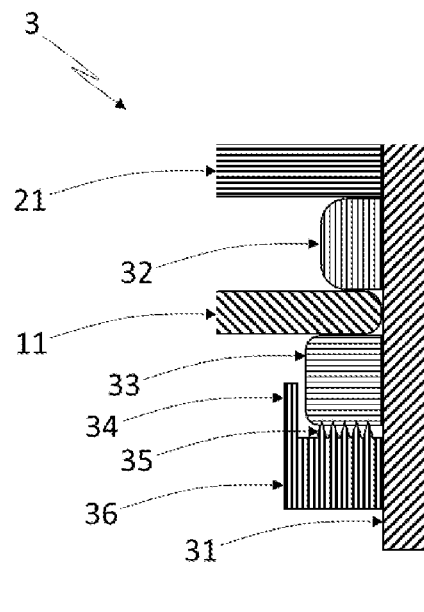
FIG. 4 is a cross-section view of a third sample embodiment of an inventive setting device.

In the sample embodiment of FIG. 4, the setting device 3 features both a rigid enclosure 34 and the prongs 35 on the front contact surface for the setting element 33.

The design of the invention is not limited to the preferred embodiments specified here. Rather, a number of variants are conceivable, which make use of the present solution even in designs of a fundamentally different type. All of the features and/or advantages arising from the Claims, the description or the drawings, including design details and physical layouts, may be vital to the invention both by themselves and in a wide variety of combinations.

LIST OF REFERENCE NUMBERS

100 Headlamp
1 Light module
11 Holder section
2 Carrier frame
21 Mounting section
3 Setting device
31 Adjusting screw
32 Pretensioning element
33 Setting element
34 Enclosure
35 Prongs
36 Nut
4 Printed circuit board
5 Light group

I claim:

1. A headlamp for a motor vehicle, the headlamp comprising:
a light module,
a carrier frame, and
a setting device,
where the light module is accommodated on the carrier frame so as to be rotatable around a rotary axis (D),
where the setting device includes an adjusting screw that connects a holder section of the light module with a mounting section of the carrier frame radially at a distance from the rotary axis (D) in such a way that the light module is arranged in a target position,
where the setting device includes a pretensioning element held by the adjusting screw that pretensions the light module in the target position,
wherein the setting device features a thermoplastic polymer setting element held by the adjusting screw arranged on a side of the holder section facing away from the pretensioning element and which is formed into a heat-induced contraction or shrinkage.

2. The headlamp in accordance with claim 1, wherein the contraction or shrinkage is induced by heating the setting element to a temperature in the range from 60° C. to 100° C.

3. The headlamp in accordance with claim 1, wherein the setting element is conditioned such that a predefined reduction is created in the dimension of the setting element in a direction parallel to the axis of the adjusting screw due to the contraction or shrinkage.

4. The headlamp in accordance with claim 1, wherein sections of the setting element is surrounded by a rigid enclosure forming a circumferential gap.

5. The headlamp in accordance with claim 1, wherein at least one front side of the setting element makes contact at a contact face with a large number of prongs, studs, or other elevations.

6. The headlamp in accordance with claim 1, wherein the rotary axis (D) runs horizontally in a specified installation position of the headlamp, where the setting device is designed in such a way that when the setting element contracts or shrinks the light module can be rotated around the rotary axis (D) by the pretensioning element in such a direction of rotation that the direction of light emission from the light module is pivoted upwards.

* * * * *